United States Patent [19]
Ishii et al.

[11] 3,880,804
[45] Apr. 29, 1975

[54] METHOD OF STABILIZING OXYMETHYLENE COPOLYMERS

[75] Inventors: Takami Ishii, Chiba; Taro Suzuki, Ube; Naohisa Takikawa; Sunao Kitamura, both of Onoda; Tadamasa Wakabayashi; Hiromi Kumahara, both of Ube, all of Japan

[73] Assignee: UBE Industries Ltd., Ube, Yamaguchi, Japan

[22] Filed: July 22, 1974

[21] Appl. No.: 490,280

[30] Foreign Application Priority Data
July 23, 1973 Japan.................................. 48-80915

[52] U.S. Cl........................................... 260/45.85 N
[51] Int. Cl............................................. C08g 51/58
[58] Field of Search.............................. 260/45.85 N

[56] References Cited
UNITED STATES PATENTS
2,000,152   5/1935   Walker .............................. 260/45.9
2,936,298   5/1960   Hudgin et al. ..................... 260/45.9

*Primary Examiner*—V. P. Hoke
*Attorney, Agent, or Firm*—Sherman and Shalloway

[57] ABSTRACT

A method of stabilizing oxymethylene copolymers which comprises heating an oxymethylene copolymer at a temperature of from about 100° to about 170°C. in an aqueous medium in the presence of a salt selected from the group consisting of sodium and potassium salts of ethylenediamine-tetraacetic acid under the conditions of a pH value of from about 4 to about 7.

4 Claims, No Drawings

METHOD OF STABILIZING OXYMETHYLENE COPOLYMERS

This invention relates to a method of stabilizing the oxymethylene copolymers by which method superior thermal stability and base stability can be conferred on the oxymethylene copolymers without the entailment of such drawbacks as objectionable discoloration or substantial reduction of the intrinsic viscosity of the copolymer. More particularly, the invention relates to a method of stabilizing the oxymethylene copolymers which comprises heating the oxymethylene copolymers at a temperature of from about 100° to about 170°C. in an aqueous medium in the presence of either a sodium or potassium salt of ethylenediaminetetraacetic acid under the conditions of a pH value of from about 4 to about 7.

Method of preparing the oxymethylene copolymers are well known. For example, they can be prepared by a method of copolymerizing trioxane and a cyclic ether in the presence of a Lewis acid (U.S. Pat. No. 3,027,352); a method of reacting an oxymethylene homopolymer and 1,3-dioxolane in the presence of a Lewis acid (British Pat. No. 1,103,730); a method of copolymerizing formaldehyde and a cyclic ether in the presence of a reaction product mixture of a metal chelate compound and a Lewis acid (U.S. Pat. No. 3,803,094); or a method of reacting an oxymethylene homopolymer and 1,3,6-trioxocane (Japanese Patent Publication No. 3711/73).

Since the oxymethylene copolymer prepared in this manner has at its ends an unstable portion consisting of the oxymethylene units and moreover it contains the oxymethylene homopolymer, its thermal stability and stability in basic media are poor. It was thus known to possess shortcomings making it not fit for practical use.

Various suggestions have been made with a view to stabilizing the oxymethylene copolymers having such unstable terminal groups. For example, in Belgian Pat. No. 602,869, there is suggested a method of stabilizing the oxymethylene copolymers by submitting them either to alkaline hydrolysis or alcoholysis in an aqueous medium, e.g., water, alcohol or a mixture thereof in the presence of an alkaline substance such as alkali metal hydroxides, alkaline earth metal hydroxides, ammonia and amines. According to this suggestion, acidic hydrolysis is held to be nonselective and hence should be avoided. Again, neutral hydrolysis is also held to be undesirable. On the other hand, in Japanese Patent Publication No. 10951/1970, there is suggested in contradistinction to the above-mentioned suggestion a stabilization method in which the oxymethylene copolymers are heat-treated in an aqueous medium of a pH not more than 7 containing, say, an inorganic neutral salt, say, an alkali metal sulfate or an alkali metal halide in an amount of 0.1 - 30 wt. percent of said polymer. There is disclosed in this proposal that it was found that the foregoing inorganic neutral salts had a de-activating action on the catalyst used in the preparation of the oxymethylene copolymers such, for example, as boron trifluoride etherate, with the consequence that the thermal stability of the oxymethylene copolymers was improved. And in this latter proposal there is shown by way of comparison an experiment carried out by using as an alkaline substance triethanolamine in accordance with the suggestion of the former Belgian patent, thus showing that experimentally equal results are obtained as in the former suggestion by the use of inorganic neutral salts and that the latter was rather to be preferred when the matter of discoloration of the copolymer was considered. On the basis of this experiment, the proponent of the latter proposal concludes that the inorganic neutral salts possess an equal degree of stabilization effects as in the case of the alkaline substances of the former proposal and that hence the presence of the alkaline substances as in the former proposal is essentially of no significance at all.

While the possibility of an objectionable reduction of a molecular weight of the oxymethylene copolymer is small in the case of the alkaline hydrolysis of the former proposal using an alkaline substance, the disadvantage of the copolymer becoming discolored cannot be avoided. On the other hand, in the case of acidic hydrolysis, as indicated in the aforementioned Belgian patent, difficulty is experienced in selectively removing the unstable portions at the ends of the oxymethylene copolymer without the accompaniment of an objectionable reduction of the molecular weight of the copolymer.

In consequence of our researches with a view to solving this contradictory problem, we found that this problem could be solved by a single action wherein the oxymethylene copolymers were heated at a temperature of from about 100° to about 170°C. in the presence of either a sodium or potassium salt of ethylenediaminetetraacetic acid (EDTA) under acidic conditions of a pH value of from about 4 to about 7, and preferably at least 4 and less than 7. It was further found that by so doing it was possible to provide with a high degree of quality reproducibility an excellent stabilized copolymer whose degree of base stability exceeds the value of at least about 99 percent that is required for it to be of practical use, this being achieved without the entailment of an objectionable discoloration of the copolymer or a substantial reduction of its intrinsic viscosity.

It is therefore an object of this invention to solve by a single action the technical contradictions of the heretofore made proposals and provide a method of stabilizing the oxymethylene copolymers having the aboveindicated improvement effects.

Other objects and advantages of the invention will become apparent from the following description.

In the invention method, the stabilization of the oxymethylene copolymer is carried out in an aqueous medium as noted hereinbefore. This aqueous medium is known from the various proposals that have been previously described. Of the various aqueous media, either water or a mixture of water and alcohol is preferably used in the invention method. While there is imposed no special restriction as to the amount of the aqueous medium to be used, a suitable amount that is not too small nor too large is best used from the standpoint of operations. The aqueous medium is usually used in an amount of from about 400 to about 2,000 parts by weight per 100 parts by weight of the oxymethylene copolymer to be submitted to the stabilization treatment. Where a mixture of water and alcohol is used, the alcohol is preferably used in an amount of not more than about 950 parts by weight per 100 parts by weight of water. The class of alcohol used is imposed no special restriction and may be freely chosen. As examples of these alcohols, mention can be made of aliphatic monohydric alcohols such as methanol, ethanol, n- propyl alcohol, isopropyl alcohol, allyl alcohol and vinyl alcohol; aliphatic polyhydric alcohols such as ethylene glycol, 1,2-butanediol, 1,6-hexanediol, glycerol and pentaerythritol; and aromatic alcohols such as benzyl alcohol, phenylethanol and diphenylcarbinol.

The oxymethylene copolymer to be stabilized by the invention method can be obtained by the known methods such as described hereinbefore and possesses at its ends an unstable portion consisting of oxymethylene units. Usually, an oxymethylene copolymer having an $[\eta]$ (the intrinsic viscosity as measured at 60°C. on a solution of the copolymer in p-chlorophenol containing 2 wt. percent of alpha-pinene) of from about 1.0 to about 2.5 is used.

In the invention method the stabilization reaction is carried out in the presence of a sodium and/or potassium salt of EDTA under pH conditions of from about 4 to about 7, and preferably above 4 and less than 7. The objects of the present invention cannot be achieved under alkaline conditions in which only the sodium and/or potassium salt of EDTA has been used or under alkaline conditions in which in addition to the presence of these salts other alkaline substances are caused to be copresent. Further, the objects of the invention cannot be achieved under conditions of a pH value of from about 4 to about 7 in which the sodium and/or potassium salt of EDTA has been omitted. These facts will be illustrated by the hereinafter given control experiments.

As examples of the foregoing salts of EDTA, there can be named the tetrasodium and disodium salts of EDTA and the tetrapotassium and dipotassium salts of EDTA. While the amount in which these salts of EDTA are used can be suitably varied in accordance with the class of oxymethylene copolymer, the pH adjustment conditions, the temperature of the stabilization reaction, and the class and amount of the aqueous medium, they are usually used in an amount of at least about 0.1 part by weight per 100 parts by weight of the oxymethylene copolymer. As there is no further enhancement of the stabilization effects by the use of these salts in a larger amount, usually their use in an amount of the order of from about 0.1 to about 3.0 parts by weight per 100 parts by weight of the oxymethylene copolymer will suffice. If desired, a larger amount may also be used.

According to the invention method, the stabilization reaction is preferably carried out while adjusting the pH value of the reaction system at from about 4 to about 7 throughout the time the stabilization reaction is being carried out in the presence of the sodium and/or potassium salt of EDTA such as indicated above. Of course, a deviation from these pH conditions for a short period of time of an extent that does not result in the improvement effects of the present invention being lost is permissible, but it is preferred that the above-indicated range be maintained during the reaction. The adjustment of the pH value can be readily accomplished by the addition to the reaction system of known acidic substances or basic substances. Since the aqueous solution of a sodium and/or potassium salt of EDTA is basic in character, the pH value can be adjusted to from about 4 to about 7 by adding to the reaction system a known acidic substance, e.g., an inorganic acidic substance such as hydrochloric, sulfuric or phosphoric acid, or an organic acidic substance such as acetic, propionic or butyric acid. As the reaction proceeds, formaldehyde or formic acid is formed, with the consequence that the pH value of the reaction system drops below 4 at times. In such a case the pH value of the reaction system can be adjusted to the aforesaid range of from about 4 to about 7 by the further addition thereto of a sodium and/or potassium salt of EDTA or other known basic substances such, for example, as the inorganic basic substances as ammonia, sodium hydroxide and potassium hydroxide and the organic basic substances as aniline and ethylenediamine.

When the pH value of the reaction system becomes less than about 4, the main chain of the oxymethylene copolymer is susceptible to breakage to result in the possibility of a substantial drop in the molecular weight of the resulting stabilized oxymethylene copolymer. On the other hand, when the ph value of the reaction system exceeds about 7 and becomes alkaline in character, discoloration of the resulting stabilized oxymethylene copolymer takes place to cause a marked decline in its practical utility value.

In this invention, as hereinbefore indicated, the stabilization reaction is carried out at a temperature ranging between about 100° and about 170°C. When the temperature is too low, i.e., below about 100°C., the stabilization of the oxymethylene copolymer does not take place sufficiently, whereas when it is too high such that 170°C. is exceeded, substantial breakage of the main chain of the oxymethylene copolymer takes place. If melting of the oxymethylene copolymer occurs during the reaction, difficulty is experienced in the after treatment of the polymer, say, its washing. Hence, the reaction is preferably carried out at a temperature that does not melt the oxymethylene copolymer.

The reaction time is suitably varied in accordance with the amount of the sodium and/or potassium salt of EDTA used, the pH value of the reaction system and the reaction temperature, but usually about 10 minutes to about 100 minutes will suffice.

The following examples along with control experiments will be given to more fully illustrate several modes of practicing the invention method.

In the following description:

1. The polymer yield is the percentage by weight of stabilized oxymethylene copolymer recovered on the basis of the oxymethylene copolymer charged.

2. $[\eta]$ is the intrinsic viscosity as measured at 60°C. on a solution of the oxymethylene copolymer in p-chlorophenol containing 2 wt. percent of alphapinene.

3. The degree of base stability is a value obtained in the following manner. About 10 grams of polymer is weighed out. This polymer is added to a combined solution of 1.0 milliliter of tri-n-butylamine and 100 milliliters of benzyl alcohol. After heating this mixture for 2 hours at 160°C., it is cooled, and the precipitated polymer is recovered and followed by washing with acetone and drying. The weight of the so obtained polymer relative to that of polymer before its treatment expressed in percentage is designated the degree of base stability. This degree of base stability becomes the measure of the amount of the unstable portion at the ends of the oxymethylene copolymer and the oxymethylene homopolymer contained in the oxymethylene copolymer. The higher this degree of base stability, the smaller the amount of the aforesaid unstable portion and content of oxymethylene homopolymer. A value of above 99 percent is desired from the standpoint of the practical usefulness of the resulting oxymethylene copolymer.

4. $A_{222}$ is the reaction rate constant for thermal degradation at 222°C, in atmospheric air of a composition obtained by incorporating in 100 parts by weight of the resulting stabilized oxymethylene copolymer 0.2 part by weight of 2,2'-methylene-bis(4-methyl-6-tert. butylphenol) and 0.5 part by weight of a polyamide (terpolymer of 38 percent polycaprolactam/35 percent polyhexamethylene adipamide/27 percent polyhexamethylene sebacamide) and is a value calculated as follows:

$A_{222} = (2.303/t) \log (W_o/W) \times 100$ (percent/min)

wherein $t$ is the measurement time (min.), $W_o$ is the original polymer weight, and $W$ is the weight of the sample $t$ minutes after the initiation of the measurement.

EXAMPLES 1 – 4

One hundred grams of an oxymethylene copolymer having [η] of 1.40 and a degree of base stability of 95.0 percent, 1000 grams of water and 1.0 gram of tetrasodium ethylenediaminetetraacetate were charged to a glass autoclave, following which the pH value was adjusted to the prescribed value indicated in Table 1 by adding hydrochloric acid to the reaction system. The temperature of the reaction system was raised up to 140°C. over a 15-minute period, and the reaction was carried out at this temperature for 30 minutes. After the temperature of the reaction system was raised to 140°C., 50 grams of the reaction liquid was sampled at every 10-minute intervals and its pH value was measured. The results obtained are shown in Table 1. After measurement of the pH value of the reaction liquid, a 0.1 N aqueous sodium hydroxide solution was added to this reaction liquid in an amount sufficient to bring its pH value to that prescribed in Table 1. The amount of sodium hydroxide per unit weight of the reaction liquid necessary to raise the pH value of the reaction liquid to the prescribed value was calculated from the amount of sodium hydroxide used. On the basis of this calculation, the amount of sodium hydroxide necessary to raise the pH value of the reaction system up to its prescribed value was calculated and was introduced to the autoclave under pressure as a 1 N aqueous solution along with the sampled reaction liquid.

After completion of the reaction, the polymer was separated by filtration, washed with water and then with acetone and thereafter dried under reduced pressure for 3 hours at 60°C. to obtain a stabilized oxymethylene copolymer. The polymer yield, [η], degree of base stability and $A_{222}$ of the so obtained stabilized oxymethylene copolymer are shown in the hereinafter given Table 1. The color of the stabilized oxymethylene copolymers obtained in the several examples was pure white.

Control 1

The experiment was carried out as in Example 1 but without using the tetrasodium ethylenediaminetetraacetate. The stabilized polymer was obtained at a polymer yield of 90.2 percent, and its [η] was 0.75 and degree of base stability was 95.8 percent. The [η] and degree of base stability were low, and thus this polymer was of no practical use.

Control 2

The experiment in Example 1 was repeated except that 5 grams of tetrasodium ethylenediaminetetraacetate was used and that the operation of adjusting the pH value was omitted. When the pH value of the reaction system was measured subsequent to its charging, it was 10.8. On measurement of the pH value after completion of the reaction, it was 8.2. By operating as in Example 1, the polymer was separated by filtration, washed with water and acetone and then dried under reduced pressure for 3 hours at 60°C. The polymer yield of the resulting polymer was 98.5 percent, and its [η] was 1.40, degree of base stability was 98.5 percent and $A_{222}$ was 0.05 percent/min. The polymer was light brown in color.

Control 3

The experiment in Control 2 was repeated except that 1.0 grams of the tetrasodium ethylenediaminetetraacetate was used and 0.4 gram of sodium hydroxide was further added to the reaction system. The pH value of the reaction system before the reaction was 11.3, while the pH value after completion of the reaction was 9.3. The resulting polymer had a polymer yield of 94.8 percent, and its [η] was 1.42, degree of base stability was 98.2 percent and $A_{222}$ was 0.06 percent/min. The color of the polymer was brown.

The results of Controls 1 – 3 are shown in Table 1, below, along with those of Examples 1 – 4.

Table 1

| No. | pH Value | | | | Stabilized Oxymethylene Copolymer | | | | |
| --- | --- | --- | --- | --- | --- | --- | --- | --- | --- |
| | Prescribed value | 10 minutes later | 20 minutes later | At the time of completion of reaction | Polymer yield (g) | [η] | Degree of base stability (g) | $A_{222}$ (%/min) | Color |
| Example 1 | 7.0 | 5.4 | 6.0 | 6.5 | 95.2 | 1.42 | 9966 | 0.01 | white |
| Example 2 | 6.5 | 5.2 | 5.8 | 5.9 | 95.5 | 1.42 | 99.6 | 0.01 | white |
| Example 3 | 6.0 | 4.5 | 5.0 | 5.7 | 95.5 | 1.40 | 99.4 | 0.02 | white |
| Example 4 | 5.5 | 4.1 | 4.8 | 5.2 | 95.0 | 1.40 | 99.3 | 0.02 | white |
| Control 1 | 7.0 | — | — | 3.5 | 90.2 | 0.75 | 95.8 | 0.08 | white |
| Control 2 | 10.8 | — | — | 6.2 | 95.8 | 1.40 | 98.5 | 0.05 | light brown |
| Control 3 | 11.3 | — | — | 9.3 | 94.8 | 1.42 | 98.2 | 0.06 | brown |

As is apparent from the results of Controls 2 and 3, when the reaction is carried out under basic conditions, the resulting polymers are discolored to a light brown or brown color and hence unfit for practical use. Further, as shown in Control 1, when the reaction is carried out under acidic conditions by the omission of the salt of EDTA, the drop in the polymer yield is marked, and the polymer obtained shows a decline in its [$\eta$] and an unsatisfactory degree of base stability.

sure for 3 hours at 60°C. to obtain a stabilized oxymethylene copolymer. The polymer yield of the resulting stabilized oxymethylene copolymer, its [$\eta$], degree of base stability and $A_{222}$ are shown in Table 2. The stabilized oxymethylene copolymers obtained in the several examples were all pure white in color.

After completion of the reaction, the polymer was separated by filtration and washed with water and then with acetone and thereafter dried under reduced pres- Table 2

| Example | pH Value | | | | | Stabilized Oxymethylene Copolymer | | | |
| --- | --- | --- | --- | --- | --- | --- | --- | --- | --- |
| | Prescribed value | 10 Minutes later | 20 minutes later | At the completion of reaction | Total added of EDTA·4Na * (g) | Polymer yield (g) | [$\eta$] | Degre of base lity | $A_{222}$ |
| 5 | 7.0 | 5.2 | 6.0 | 6.3 | 0.25 | 95.8 | 1.41 | 99.3 | 0.02 |
| 6 | 6.5 | 5.0 | 5.5 | 5.9 | 0.22 | 95.4 | 1.42 | 99.2 | 0.02 |
| 7 | 6.0 | 4.1 | 4.8 | 4.8 | 0.20 | 95.4 | 1.38 | 99.0 | 0.02 |
| 8 | 5.5 | 4.0 | 4.3 | 4.5 | 0.14 | 94.8 | 1.36 | 99.0 | 0.03 |

EXAMPLES 5 – 8

One hundred grams of an oxymethylene copolymer of [$\eta$] 1.40 and a degree of base stability of 95.0 percent and 1000 grams of water were charged to a glass autoclave. The pH value of this system was 5.0. The pH value of this system was adjusted to the prescribed value indicated in Table 2 by the addition thereto of an aqueous 5 wt. percent solution of tetrasodium ethylenediaminetetraacetate. The temperature of this reaction system was raised up to 140°C. in 15 minutes, and the reaction was carried out by holding the system at this temperature for 30 minutes. After the temperature of the reaction system had risen to 140°C., 50 grams of the reaction liquid was sampled at every 10-minute intervals and its pH value was test. The results are shown in Table 2. Immediately thereafter an aqueous 5 wt. percent solution of tetrasodium ethylenediaminetetraacetate was added to this reaction liquid in an amount sufficient to bring its pH value to that prescribed in Table 2. The amount of tetrasodium ethylenediaminetetraacetate per unit weight of the reaction liquid necessary to raise the pH value of the reaction liquid to the prescribed value was calculated from the amount of tetrasodium ethylenediaminetetraacetate used. On the basis of this calculation, the amount of tetrasodium ethylenediaminetetraacetate necessary to raise the pH value of the reaction system up to its prescribed value was calculated and was introduced to the autoclave under pressure as an aqueous 5 wt. percent solution along with the sampled reaction liquid.

EXAMPLE 9

The stabilization of oxymethylene copolymer was carried out by operating as in Example 1 but using instead of water a mixture of 100 grams of water and 900 grams of ethanol. The stabilized oxymethylene copolymer was obtained at a polymer yield of 94.8 percent, and its [$\eta$] was 1.40, degree of base stability was 99.1 percent and $A_{222}$ was 0.02/min. The color of the polymer was pure white.

We claim:

1. A method of stabilizing oxymethylene copolymers which comprises heating an oxymethylene copolymer at a temperature of from about 100° to about 170°C. in an aqueous medium in the presence of a salt selected from the group consisting of sodium and potassium salts of ethylenediaminetetraacetic acid under the conditions of a pH value of from about 4 to about 7.

2. The method of claim 1 wherein said aqueous medium is a medium selected from the group consisting of water and a mixture of water and an alcohol.

3. The method of claim 1 wherein said salt of ethylenediaminetetraacetic acid is used in an amount of at least about 0.1 part by weight per 100 parts by weight of the oxymethylene copolymer.

4. The method of claim 2 wherein said aqueous medium is a mixture of water and an alcohol consisting of not more than about 950 parts by weight of the latter per 100 parts by weight of the former.

* * * * *